Jan. 13, 1970 R. KISSLING 3,488,891
GRINDING MACHINES
Filed July 18, 1966 4 Sheets-Sheet 1

FIG. I

INVENTOR
RUDOLF KISSLING

BY Jacobi & Davidson

ATTORNEYS

Jan. 13, 1970  R. KISSLING  3,488,891
GRINDING MACHINES
Filed July 18, 1966  4 Sheets-Sheet 2

INVENTOR
RUDOLF KISSLING

BY

ATTORNEYS

Jan. 13, 1970   R. KISSLING   3,488,891
GRINDING MACHINES

Filed July 18, 1966   4 Sheets-Sheet 4

INVENTOR.
RUDOLF KISSLING
BY Jacobi & Davidson
ATTORNEYS

United States Patent Office 3,488,891
Patented Jan. 13, 1970

3,488,891
GRINDING MACHINES
Rudolf Kissling, Reinach, Switzerland, assignor to Georg Fischer Aktiengesellschaft, Schaffhausen, Switzerland, a corporation of Switzerland
Filed July 18, 1966, Ser. No. 566,141
Claims priority, application Switzerland, May 28, 1966, 7,877/66
Int. Cl. B24b 29/00
U.S. Cl. 51—145                                                 8 Claims

ABSTRACT OF THE DISCLOSURE

A grinding machine comprising a grinding head and a rotatable workholder for holding a workpiece, and wherein the grinding head is supported by a spring on a horizontally and vertically adjustable beam and is displaceable along guides, the grinding head being provided with switch actuator members which cooperate with control switches that serve to control the vertical adjustment of the adjustable beam and thus of the grinding head.

---

The present invention relates to grinding machines for internally grinding the interiors of tanks and the bottoms of apparatuses, and comprising a grinding head and a rotatable work holder for holding a workpiece.

An object of the invention is to provide a device by means of which tanks and apparatus bottoms can be rationally and economically ground.

The present invention consists in a grinding machine comprising a grinding head and a rotatable work holder for holding a workpiece, wherein the grinding head is supported by a spring on a horizontally and vertically adjustable beam and is displaceable along guides, the grinding head being provided with switch actuator members which co-operate with control switches for controlling the vertical adjustment of the grinding head.

To make the invention more readily understood, reference will now be made to the accompanying drawings, which are given by way of example, and wherein.

Figure 1:
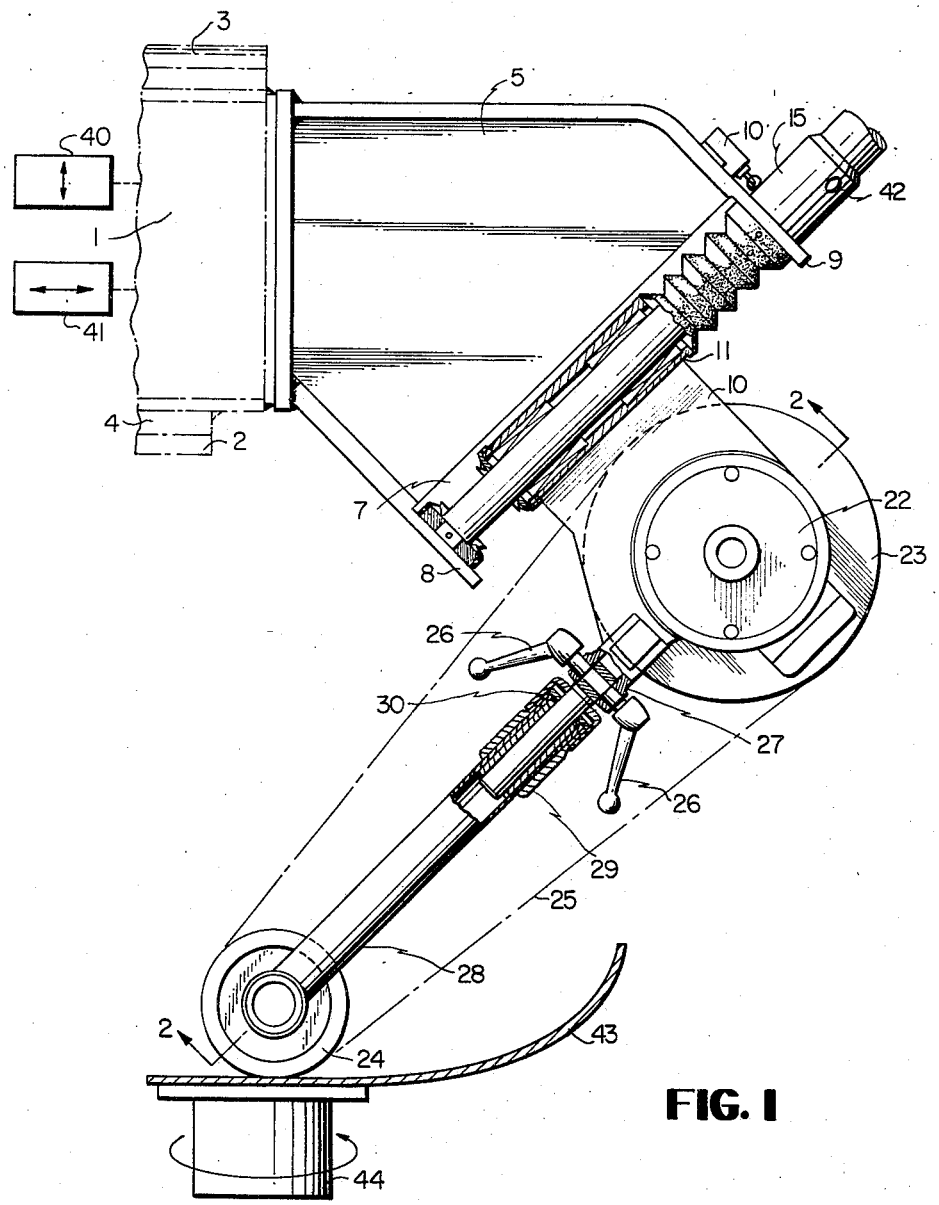
FIGURE 1 shows in vertical section parts of a grinding machine having an arm carrying a grinding head.

The grinding machine shown in the drawings, which is intended for grinding the interiors of tanks and the bottoms of apparatus, has a machine bed (not shown) of known construction. A support is raised and lowered by means of a worm driven by a motor generally designated 40, the support and worm being omitted from the drawings. A horizontally extending beam 1 is arranged in the support, the beam 1 being made of parts welded together to form a box-shaped cross-section, and upper and lower guide rails 2 and 3 being secured to the beam 1. In the lower guide rails there is provided a rack 4 in which a drive gear (not shown) engages for effecting horizontal movement of the beam 1 powered by a motor generally designated 41. Adjustable and fixable actuating cams (not shown) are provided in the upper rails 3 for actuating end switches for automatically controlling the forward and return horizontal movement of the beam 1.

Figure 2:
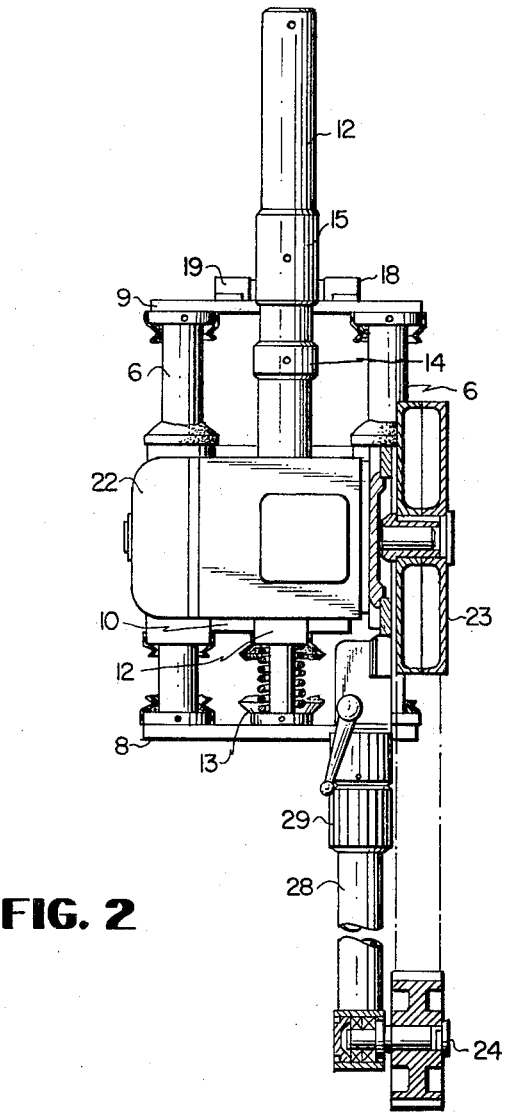
FIGURE 2 shows a section taken along the line 2—2 of FIG. 1.
Figure 3:
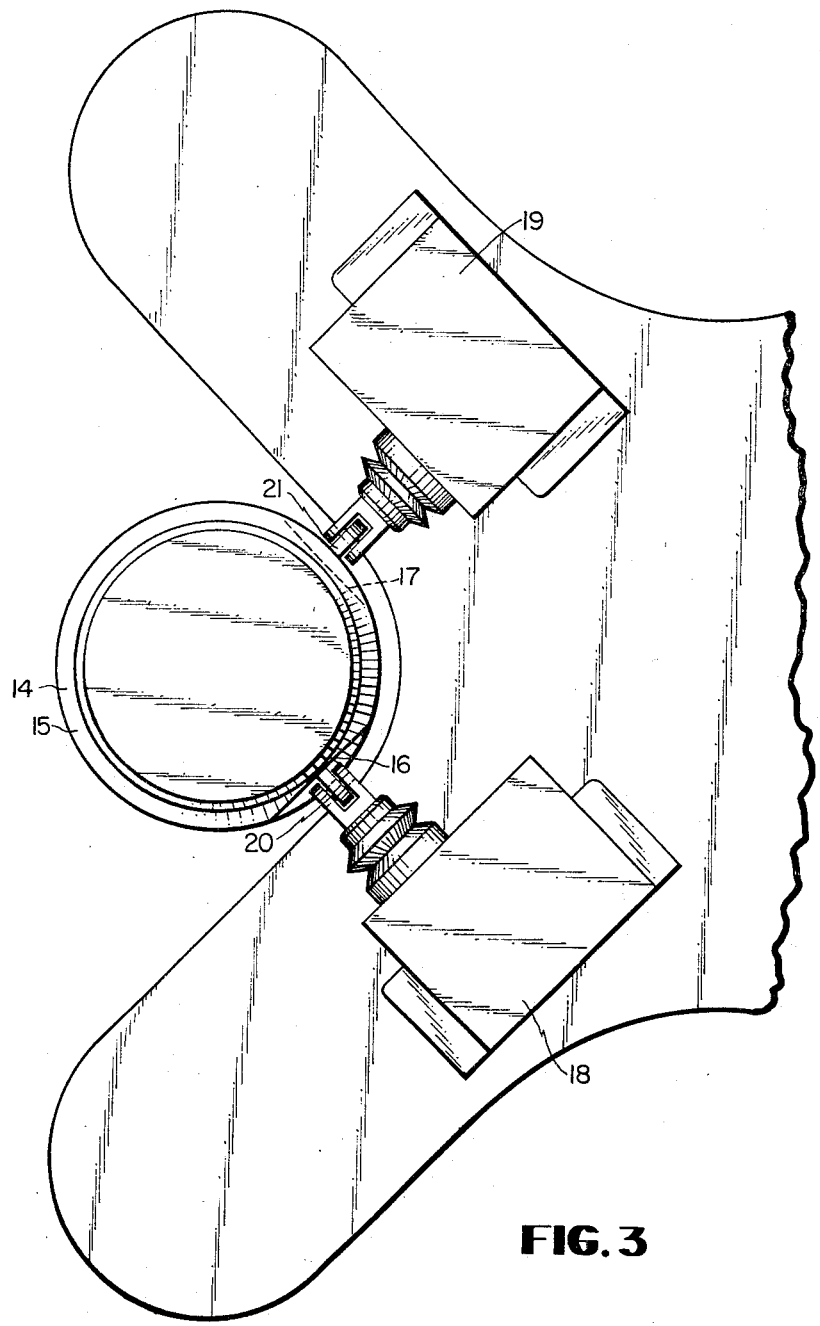
FIGURE 3 shows a schematic illustration of control members forming parts of the machine of FIGS. 1 and 2.

At one end of the beam 1 there is secured a bracket 5, which has a box-shape, and two guide posts 6. The posts 6 are arranged at a spacing from one another in front of the front wall 7 of the bracket 5 between mounting plates 8 and 9 projecting from the bracket 5, and serve for supporting a slide 10. The slide 10 is displaceable and slides by means of conical bearings 11 on the guide posts 6 and is provided with a central guide tube 12 movable therewith (FIG. 2) which at its lower end is supported by means of a compression spring 13 on the lower mounting plate 8. The upper end of the guide tube 12, projecting from the slide 10, is provided with two actuator rings 14 and 15 which have different lengths and which have ground control surfaces 16 and 17 (FIG. 3) which are radially offset from one another. On the upper mounting plate 9 in the vicinity of the guide tube 12 there are provided switches 18 and 19 which are actuatable through rollers 20 and 21, the switching on and off of the switches 18 and 19 preferably being effected with a time delay introduced by means of a delay relay or other mechanism associated therewith. The switches 18 and 19 serve for switching on and off the motor generally designated 40 for vertically adjusting the support and the beam 1.

A grinding motor 22 (FIGS. 1 and 2) provided with a drive pulley 23 is mounted on the slide 10. A grinding arm 28, which is pivotable and can be fixed in position, is also arranged on the slide 10 and carries at one of its ends a grinding disc or pulley 24, a grinding belt 25 connecting the disc 24 and the drive pulley 23. By means of set screws 26 a linkage connection 27 between the grinding arm 28 and the slide 10 can be locked, and for ensuring that the axes of the disc 24 and the motor 22 are parallel a detent or adjustment groove (not shown) may be provided in the linkage 27. The axes of the disc 24 and the motor 22 can be adjusted relative to one another by means of threaded sleeve 29. Moreover, the spacing of the axes of the pulley 23 and the disc 24 can be altered. For this purpose, the grinding arm 28 is constructed as a telescopic tube, the two tube parts which are adjustable and fixable relative to one another by means of an adjustment nut 30.

The spring 13 is compressed by the weight of the slide 10 and the grinding motor 22 so that the slide 10 moves downwardly on the guide posts 6, the spring assuring that the entire weight of the slide 10 and associated structure does not come to rest on the workpiece.

The grinding pressure is regulated by an electrical control, the control rings 14 and 15 being adjustable on the guide tube 12 by means of adjustment screws 42 or the like for actuating the switches 18 and 19 mounted on the control panel of the machine for raising and lowering the support carrying the beam.

Figure 4:
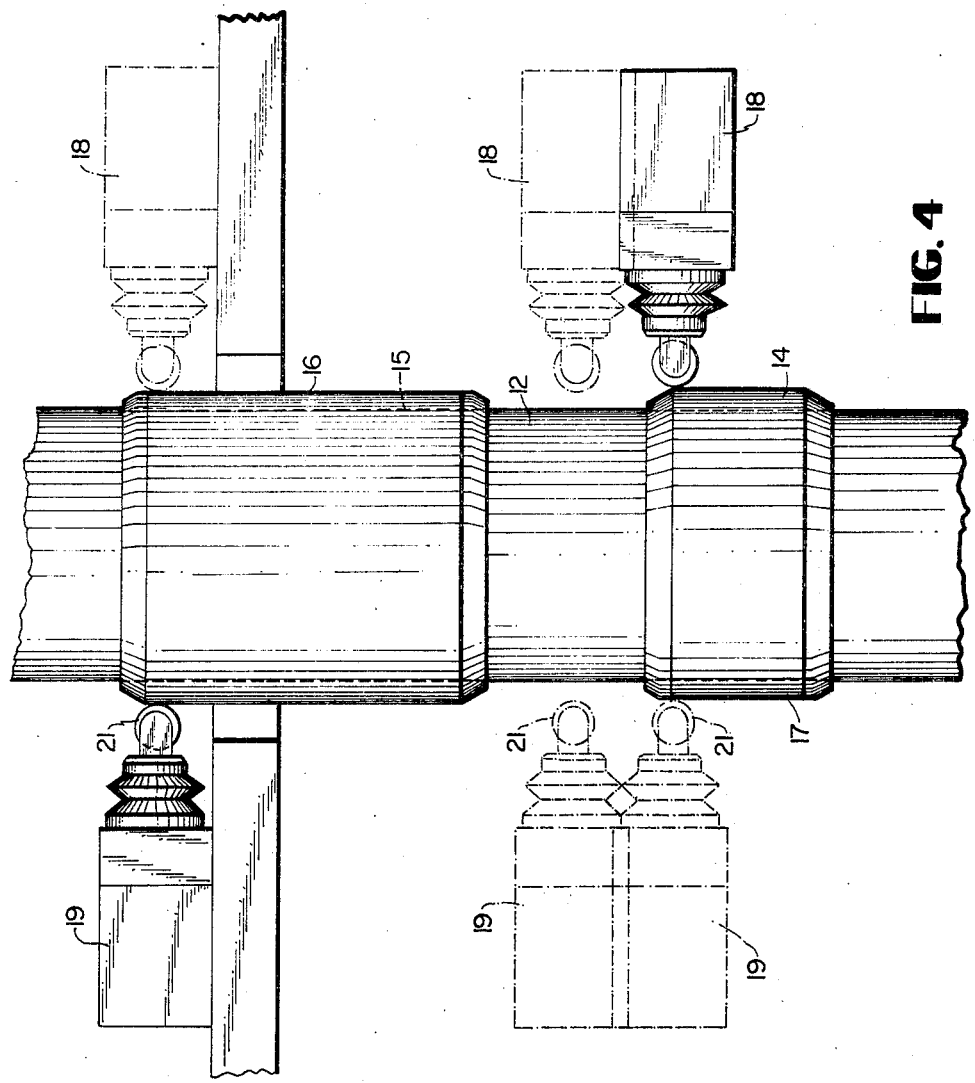
FIGURE 4 shows a schematic illustration of the operation of the control members.

In FIG. 4 different actuating positions are illustrated, the guide tube 12 with the control rings 14 anr 15 being shown fixed and the switches 18 and 19 being shown movable along the tube for the sake of simplicity, although in reality the control rings 14 and 15 move relative to the switches 18 and 19.

When the grinding machine is switched on, the beam 1 moves to and fro under the control of the end switches, mentioned above, the grinding belt 25 simultaneously being driven so that a hollow body generally designated 43 which is to be ground and which is clamped in a rotatable work holder generally designated 44 is machined. When one of the switches 18 and 19 is actuated by one of the actuator rings 14 and 15, the beam 1 begins vertical movement the duration of which is determined by a time relay. In this way the pressure of the disc 24 is prevented from increasing undesirably.

In FIG. 4, a normal rest position is indicated by I, in which the switch 18 is open and the switch 19 is closed. This is caused by the ground control surface 16 of the actuator ring 15 being disposed in the vicinity of the switch 18, so that the latter is not actuated, while the switch 19 is closed by the actuator ring 15. In a working position, indicated by II, the switch 18 remains open while the switch 19 is opened with a delay after leaving the switch ring 15.

The grinding pressure is limited as shown by position III, in which the switch 19 is open due to the control surface 17 and the switch 18 is closed by the actuator ring 14. In this way an automatic control of the pressure of the disc 24 is obtained and overloading of the grinding motor 22 is safely avoided. By adjustment of the actuator rings the grinding pressure can be increased or decreased.

What I claim is:

1. A grinding machine comprising a grinding head and a rotatable work holder for holding a workpiece; beam means, said beam means being adjustable in a horizontal and a vertical direction; mounting means for displaceably mounting said grinding head on said beam means, said grinding head being movable within predetermined limits in at least the vertical direction; and switch means associated with said mounting means and responsive to said movement of said grinding head for automatically controlling the adjustment of said beam means in a vertical direction.

2. A machine as defined in claim 1, wherein said mounting means comprises a bracket carried by said beam means, said bracket having two guide posts, and a slide means displaceably on said guide posts and being slidable thereon, said grinding head being carried on said sliding means.

3. A machine as defined in claim 2, further including tube means disposed in parallel relationship to said guide posts and attached to said slide means, spring means coupled at one end thereof to said bracket and at the other end thereof to said tube means for resiliently mounting said slide means and thus said grinding head carried thereon in said bracket, said switch means comprising ring means carried on said tube means defining upper and lower limits of movement of said grinding head within said mounting means, and control switches fixedly mounted on said bracket and operated by said spring means.

4. A machine as defined in claim 3 wherein said ring means have different lengths and have ground control surfaces radially off-set relative to one another, said ring means defining cams for said control switches.

5. A machine as defined in claim 4, further including motor means for effecting vertical adjustment of said beam means, and wherein said control switches are coupled to said motor means.

6. A machine as defined in claim 5, wherein said grinding head comprises a grinding motor disposed on said slide means, and a swingable and fixable grinding arm carrying a grinding belt disc.

7. A machine as defined in claim 6, wherein said grinding arm is constructed as a telescopic tube.

8. A machine as defined in claim 7, wherein said ring means are adjustable with respect to their position and said tube means.

References Cited

UNITED STATES PATENTS

| | | | |
|---|---|---|---|
| 2,197,287 | 4/1940 | Almendinger. | |
| 2,364,879 | 12/1944 | Talboys | 51—178 |
| 2,558,300 | 6/1951 | Knapp | 51—147 X |
| 2,561,589 | 7/1951 | Newton | 51—147 |
| 2,573,220 | 10/1951 | Riedesel | 51—142 |
| 2,932,926 | 4/1960 | Dreiling | 51—142 |
| 2,997,815 | 8/1961 | Guinn | 51—92 |
| 3,044,222 | 7/1962 | Davis | 51—142 |
| 3,053,018 | 9/1962 | Tracy | 51—99 X |

FOREIGN PATENTS 961,060    3/1957    Germany.

ROBERT C. RIORDON, Primary Examiner

D. G. KELLY, Assistant Examiner

U.S. Cl. X.R.

51—35, 165